US011985484B2

(12) United States Patent
Tsuge

(10) Patent No.: US 11,985,484 B2
(45) Date of Patent: May 14, 2024

(54) IMPLEMENT TO BE WORN ON OUTER EAR

(71) Applicant: ListeningAssist Corporation, Nagoya (JP)

(72) Inventor: Hayato Tsuge, Nagoya (JP)

(73) Assignee: ListeningAssist Corporation, Nagoya (JP)

( * ) Notice: Subject to any disclaimer, the term of this patent is extended or adjusted under 35 U.S.C. 154(b) by 0 days.

(21) Appl. No.: 17/770,819

(22) PCT Filed: Oct. 29, 2020

(86) PCT No.: PCT/JP2020/040698

§ 371 (c)(1),
(2) Date: Apr. 21, 2022

(87) PCT Pub. No.: WO2021/085559

PCT Pub. Date: May 6, 2021

(65) Prior Publication Data

US 2022/0377477 A1 Nov. 24, 2022

(30) Foreign Application Priority Data

Oct. 30, 2019 (JP) ................................ 2019-197472

(51) Int. Cl.
*H04R 25/00* (2006.01)
*H04R 25/02* (2006.01)

(52) U.S. Cl.
CPC ........... *H04R 25/652* (2013.01); *H04R 25/02* (2013.01); *H04R 2225/025* (2013.01)

(58) Field of Classification Search
CPC . H04R 25/652; H04R 25/02; H04R 2225/025
See application file for complete search history.

(56) References Cited

U.S. PATENT DOCUMENTS 4,311,206 A 1/1982 Johnson
4,739,512 A 4/1988 Hartl et al.
(Continued)

FOREIGN PATENT DOCUMENTS

JP 3-117999 A 5/1991
JP 6-113001 A 4/1994
(Continued)

OTHER PUBLICATIONS

International Search Report dated Dec. 8, 2020 for PCT/JP2020/040698.
(Continued)

*Primary Examiner* — Andrew L Sniezek
(74) *Attorney, Agent, or Firm* — Schmeiser, Olsen & Watts, LLP

(57) ABSTRACT

A ready-made device attachable to an outer ear achieving excellent feeling of attachment and high stability is provided. The device attachable to an outer ear according to this invention includes an inserting part of a tubular shape to be inserted into an external auditory canal and a setting part to be set in a cavity of concha, and the inserting part and the setting part are disposed on an imaginary spherical surface, and the inserting part is rotatable around a longitudinal axis thereof inside the external auditory canal. Since the setting part is arranged on the same imaginary spherical surface as the inserting part, the setting part is disposed along an inner wall of a cavity of concha in a state where the inserting part is inside the external auditory canal.

16 Claims, 7 Drawing Sheets

(56) References Cited

U.S. PATENT DOCUMENTS

| | | | | |
|---|---|---|---|---|
| 7,394,909 | B1 * | 7/2008 | Widmer | H04R 25/658 381/328 |
| 9,237,968 | B1 | 1/2016 | Orman | |
| 2004/0069560 | A1 | 4/2004 | Widmer | |
| 2009/0202098 | A1 | 8/2009 | Chan et al. | |
| 2015/0139474 | A1 * | 5/2015 | Henry | H04R 1/1016 381/380 |
| 2019/0029593 | A1 | 1/2019 | Orron et al. | |
| 2019/0208304 | A1 | 7/2019 | Cohen et al. | |

FOREIGN PATENT DOCUMENTS

| | | | | |
|---|---|---|---|---|
| JP | 8-195999 | A | 7/1996 | |
| JP | 2684812 | B2 | 12/1997 | |
| JP | 10-126873 | A | 5/1998 | |
| JP | 2012-525799 | A | 10/2012 | |
| JP | 2012-222682 | A | 11/2012 | |
| JP | 2013-58880 | A | 3/2013 | |
| JP | 2014-508553 | A | 4/2014 | |
| JP | 2015-521424 | A | 7/2015 | |
| JP | 2017-139649 | A | 8/2017 | |
| JP | 2018-98596 | A | 6/2018 | |
| WO | WO-2016118401 | A1 * | 7/2016 | A61F 11/08 |
| WO | 20190187610 | A1 | 10/2019 | |

OTHER PUBLICATIONS

Microfilm of the specification and drawings annexed to the request of Japanese Utility Model Application No. 100150/1978 (Laid-open No. 18825/1980) (Pioneer Corp.) Feb. 6, 1980, fig. 5.

CD-ROM of the specification and drawings annexed to the request of Japanese Utility Model Application No. 86138/1992 (Laid-open No. 44504/1994) (Horiba, Ltd.) Jun. 14, 1994, fig. 1-3, 5, 6.

EP Extended Search Report dated Dec. 19, 2023 for Application No. 20881723.9.

* cited by examiner

IMPLEMENT TO BE WORN ON OUTER EAR

CROSS-REFERENCE TO RELATED APPLICATIONS

This application claims priority to PCT Application No. PCT/JP2020/040698, having a filing date of Oct. 29, 2020, based on Japanese Application No.: 2019-197472, having a filing date of Oct. 30, 2019, the entire contents both of which are hereby incorporated by reference.

FIELD OF TECHNOLOGY

The following relates to a device attachable to an outer ear for audio equipment.

BACKGROUND

Conventionally, there has been known a device attachable to an outer ear used for audio equipment (hearing equipment) such as a hearing aid, a sound reproducing device, an audio communication device, and an environmental countermeasure device (that is, a noise canceller) and is inserted into an external auditory canal of a user. Since a shape of an external auditory canal and a shape of a cavity of concha continuous with the external auditory canal vary greatly from individual to individual, some measures are required to stably attach a device attachable to an outer ear to an external auditory canal.

If a device attachable to an outer ear is custom-made by taking an ear impression of an external auditory canal and a cavity of concha of an individual user, such a device can be stably attached to the external auditory canal. However, this makes it necessary to take an ear impression, causing another problem that a creation cost increases and a creation period becomes long.

On the other hand, a ready-made device attachable to an outer ear does not need an ear impression, and therefore a creation cost is relatively low, and no creation period is needed. Earphones widely sold in the world are such ready-made earphones. On the other hand, there are sealing-type ready-made hearing aids that completely close an external auditory canal such as the one disclosed in Japanese Patent Application Publication No. 2017-139649, and such sealing-type ready-made hearing devices achieve stabilized attachment similarly to custom-made ones.

SUMMARY

In the device attachable to an outer ear described in Japanese Patent Application Publication No. 2017-139649, an ear tip to be inserted into an external auditory canal is made of a soft elastic material, and therefore the ear tip is deformed along the external auditory canal and pressed against an inner periphery of the external auditory canal with a repulsive force. Therefore, it seems that an attachment state of the device is stable. However, the position of the device in the external auditory canal is easily changed as compared with a custom-made product. If the position of the device changes in the external auditory canal, a sound pressure on an eardrum surface changes, and howling is likely to occur.

The device attachable to an outer ear described in Japanese Patent No. 2684812 is made of a relatively hard material, and includes an inserting part of a tubular shape to be inserted into an external auditory canal and a setting part to be set in a cavity of concha continuous with the inserting part. In such a device attachable to an outer ear, the inserting part does not necessarily fit external auditory canals of all users. Generally, an inserting part of a tubular shape to be inserted into an external auditory canal can fit better in the external auditory canal when the inserting part is rotated in the external auditory canal or the inserting part is moved in an axial direction thereof in the external auditory canal. However, this device is configured such that the setting part to be set in a cavity of concha is fixed with respect to the inserting part to be inserted into an external auditory canal, and therefore the setting part may undesirably interfere with a peripheral wall of the cavity of concha, thereby preventing rotation or movement of the inserting part.

Embodiments of the present invention have been made to solve the above problems, and a first aspect is defined as follows. Specifically, a device attachable to an outer ear, including: an inserting part of a tubular shape to be inserted into an external auditory canal; and a setting part to be set in a cavity of concha, wherein the inserting part and the setting part are disposed on an imaginary spherical surface, and the inserting part is rotatable around a longitudinal axis thereof inside the external auditory canal.

According to the device of the first aspect defined as described above, the inserting part is formed in a tubular shape, and therefore the inserting part can be rotated around the longitudinal axis inside the external auditory canal or the position of the inserting part can be shifted (displaced) in the longitudinal axis direction inside the external auditory canal.

Since the setting part is arranged on the same imaginary spherical surface as the inserting part, the setting part is disposed along an inner wall surface of a cavity of concha in a state where the inserting part is inside the external auditory canal. This is because a rear wall of an external auditory canal entrance and an inner wall of the cavity of concha are substantially along the imaginary spherical surface. The "spherical" as used herein is not limited to a true sphere, and encompasses an elliptic sphere and other spheres.

Therefore, when the inserting part inside the external auditory canal is rotated around the longitudinal axis thereof or displaced in an axial direction thereof, the setting part provides extremely small resistance.

This makes it possible to easily adjust a position of the device with respect to the external auditory canal with a large degree of freedom.

A second aspect of embodiments of the present invention is defined as follows. Specifically, in the device defined in the first aspect, the inserting part has a shape of a round tube or a shape of an elliptical tube.

In a case where the inserting part has a shape of a round tube or a shape of an elliptical tube, rotation of the inserting part around the longitudinal axis inside the external auditory canal is easy.

In a case where the inserting part has a shape of a round tube, the rotation inside the external auditory canal is easiest.

In a case where the inserting part has a shape of an elliptical tube, it is easy to bring a part of the ellipse into close contact with an inner peripheral surface of the external auditory canal when the inserting part is rotated. This stabilizes an acoustic effect. In addition, it is possible to form a gap with the inner peripheral surface of the external auditory canal on a side opposite to the part that is in close contact with the inner peripheral surface of the external auditory canal. As a result, it is easy to prevent ear closing feeling caused by sealing of the external auditory canal by the inserting part.

A third aspect of embodiments of the present invention is defined as follows. Specifically, in the device defined in the first or second aspect, a diameter of the inserting part gradually increases from a tip thereof toward the setting part.

This prevents the inserting part from being deeply inserted into the external auditory canal and secures an appropriate insertion state of the inserting part.

When a base end side of the inserting part, that is, a connection portion connected with the setting part has a large diameter, an insertion state of the device is stabilized. That is, in the connection portion, a dorsal side (an outer side as viewed from a user) of the inserting part comes into contact with a tragus, whereas a ventral side thereof facing the user comes into contact with the rear wall of the external auditory canal entrance. By making the diameter of the connecting portion large, this portion can be held between the tragus and the rear wall of the external auditory canal entrance. This stabilizes an attachment state of the device.

A fourth aspect of embodiments of the present invention is defined as follows. Specifically, in the device defined in the second or third aspect, the inserting part is an ellipse in cross section, and a major axis of the ellipse is in a vertical direction.

In this specification, the vertical direction refers to a gravity direction during insertion of the inserting part into the external auditory canal, and encompasses not only a physically strict gravity direction but also slightly inclined directions in consideration of a human action.

Since an external auditory canal of a person is generally vertically long, it is preferable that the inserting part also has a vertically long elliptical tubular shape. By inserting the inserting part having a vertically long elliptical tubular shape into the external auditory canal and rotating the inserting part, the inserting part can be brought into contact with an upper surface of the external auditory canal with certainty.

A fifth aspect of embodiments of the present invention is defined as follows. Specifically, in the device defined in any one of the first to fourth aspects, the setting part is wider in a vertical direction than the inserting part when viewed from a tip side of the inserting part.

By making the setting part wide in the vertical direction, the setting part can be more stably attached to a cavity of concha.

A sixth aspect of embodiments of the present invention is defined as follows. Specifically, in the device defined in any one of the first to fifth aspects, a zonally convexed portion is provided on a surface of the setting part facing the user.

The zonally convexed portion improves feeling of insertion of the setting part with respect to the cavity of concha. This is because the zonally convexed portion causes the setting part to be in line contact with biological tissues of an inner wall of the cavity of concha, and a contact area is reduced as much as possible.

In addition, the device is held between the tragus and the rear wall of the external auditory canal entrance in some cases as described above, and due to the presence of the zonally convexed portion, a gap is formed between both sides of the zonally convexed portion and the inner wall of the cavity of concha even in a state where the device is strongly held. This gap serves as a play, and mobility of the setting part during rotation of the inserting part around a longitudinal axis thereof improves. That is, the rotation of the inserting part becomes smooth.

A seventh aspect of embodiments of the present invention is defined as follows. Specifically, in the device defined in any one of the first to sixth aspects, a sound output part provided at a tip of the inserting part is disposed on a side facing the user.

This makes it possible to efficiently introduce sound waves toward an eardrum.

An eighth aspect of embodiments of the present invention is defined as follows. Specifically, in the device defined in any one of the first to seventh aspects, a groove (vent) is provided on a lower surface of the inserting part.

By providing such a groove, it is possible to prevent the external auditory canal from being sealed by the inserting part with certainty. A reason why the groove is provided on the lower side is that an upper surface of the inserting part is brought into contact with the upper wall of the external auditory canal.

Furthermore, in a hearing aid, a microphone is disposed on an upper side, and it is therefore convenient for howling prevention to form the vent on the lower side and separate the vent from the microphone.

BRIEF DESCRIPTION

Some of the embodiments will be described in detail, with reference to the following figures, wherein like designations denote like members, wherein.

DETAILED DESCRIPTION

Figure 1:
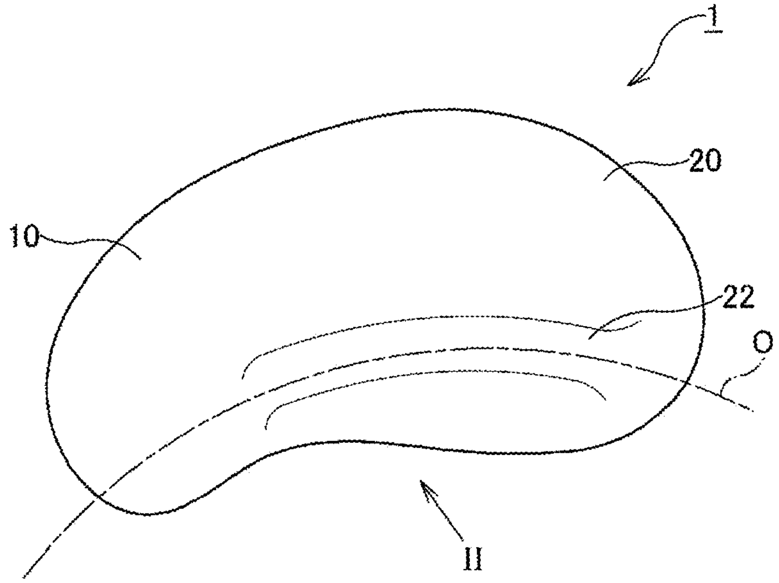
FIG. 1 is a perspective view of a basic form of a device attachable to an outer ear according to embodiments of the present invention.

FIG. 1 illustrates a device 1 attachable to an outer ear according to an embodiment.

The device 1 includes an inserting part 10 to be inserted into an external auditory canal and a setting part 20 to be set in a cavity of concha.

The inserting part 10 and the setting part 20 are arranged on an imaginary spherical surface O indicated by the line with alternate long and short dashes. More specifically, it is only necessary that ventral surfaces (surfaces in contact with a person) of the inserting part 10 and the setting part 20 are arranged on the imaginary spherical surface O. Since the ventral surfaces are arranged on the spherical surface, three-dimensional fine adjustment can be performed while keeping the setting part 20 in contact with the cavity of concha in a state where the inserting part is inside the external auditory canal.

Since both the inserting part 10 and the setting part 20 are formed in a tubular shape, it can be said that axis lines thereof are arranged on the imaginary spherical surface. These parts are formed in a tubular shape because a small-sized speaker and others are housed in these parts in some cases. Alternatively, these parts are formed in a tubular shape in order to reduce a weight by making these parts tubular, that is, hollow.

To achieve a simple structure, the axis lines of the inserting part 10 and the setting part 20 are present on a same plane orthogonal to a tangent to the imaginary spherical surface.

The axis lines may be bent three-dimensionally as long as the axis lines are arranged on the imaginary spherical surface as described above.

The device 1 can be made of a material harder than human living tissues. Examples of such a material include resin materials having good moldability and excellent durability (chemical resistance, heat resistance, light resistance), such as a methacrylic resin (acrylic) collectively referred to as thermo-plastics, and metal materials having excellent bio-compatibility, such as stainless steel and titanium. The device 1 is molded by using such a material. The device 1 may also be formed by additive manufacturing.

Examples of a soft material include silicone rubber.

The inserting part 10 is a tubular member having an elliptical cross section. A major axis of the ellipse is in the vertical direction. This is because an external auditory canal of a person is generally long in the vertical direction.

Figure 2:
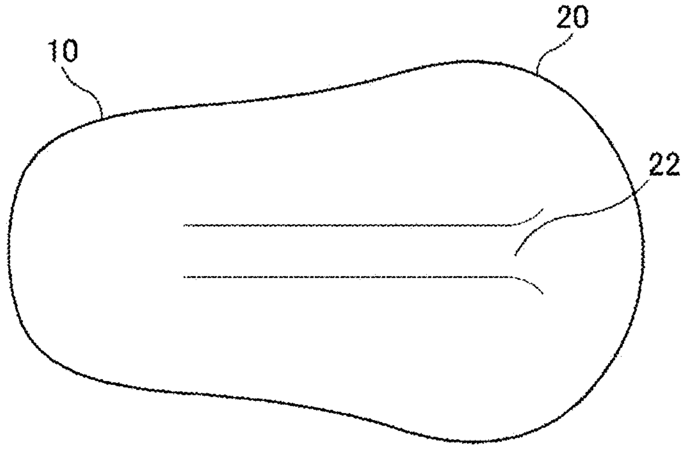
FIG. 2 illustrates a ventral surface of the device of FIG. 1 as viewed from a direction indicated by arrow II.

The inserting part 10 has a smaller diameter toward a tip side (see FIG. 2). In this example, the shape of the cross section is kept similar in the axial direction, but the shape of the cross section may vary along the axial direction.

The inserting part 10 has a larger diameter at a base end thereof (that is, a portion connected with the setting part 20).

Figure 3:
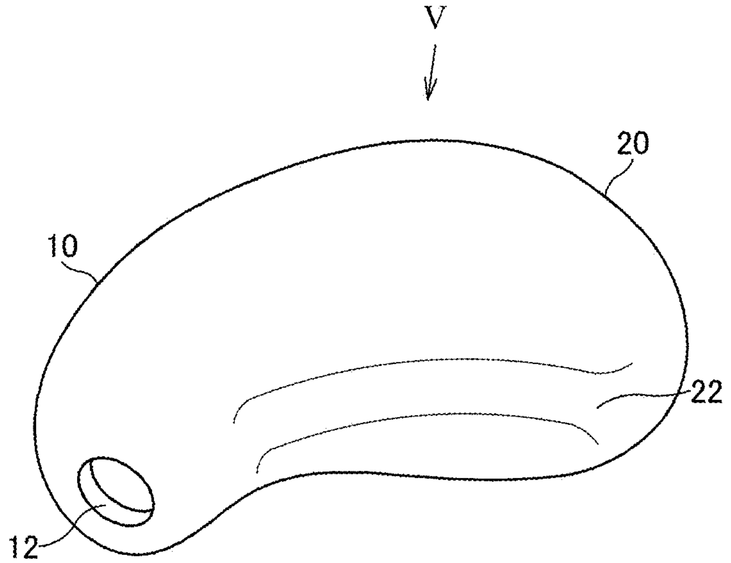
FIG. 3 is a perspective view illustrating a hearing aid to which the device of FIG. 1 is applied.

The inserting part 10 can have, on a ventral side of a tip portion thereof, an opening 12 (see FIG. 3). The opening 12 serves as a sound output portion.

Figure 4:
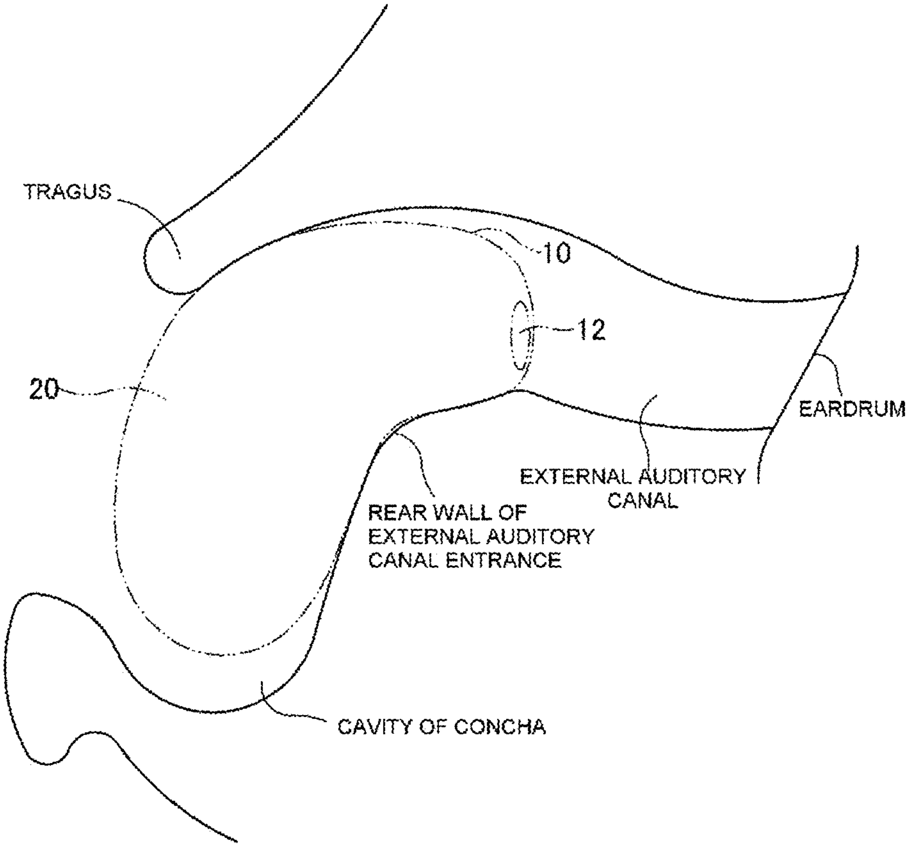
FIG. 4 is a schematic view illustrating a state in which an inserting part of the device of FIG. 3 is inside an external auditory canal.

Since the opening 12 is provided on the ventral side, sound output from the opening 12 directly reaches an eardrum in a state where the inserting part 10 is inside the external auditory canal, as illustrated in FIG. 4. On the other hand, when the opening is at a center of the inserting part 10 or on a dorsal side of the inserting part 10, sound output from the opening is more likely to interfere with the peripheral wall of the external auditory canal before reaching the eardrum.

Figure 5:
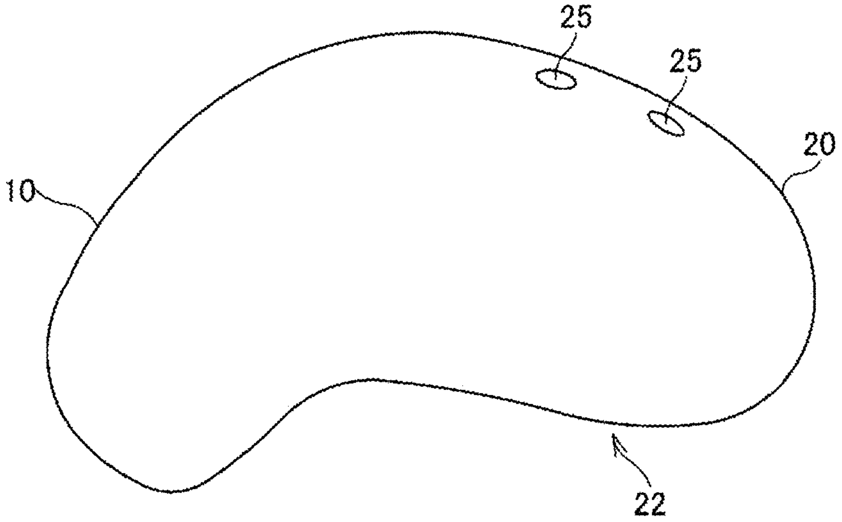
FIG. 5 is a perspective view of the device of FIG. 3 as viewed from a direction indicated by arrow V.

The setting part 20 can have a microphone hole 25 on a dorsal side thereof (see FIG. 5).

The setting part 20 is formed integrally with the base end portion of the inserting part 10. The setting part 20 becomes wider as a distance from the base end portion of the inserting part 10 increases. This is to bring the setting part 20 into contact with an inner wall of the cavity of concha with certainty and thereby ensure stability of attachment.

Figure 6:
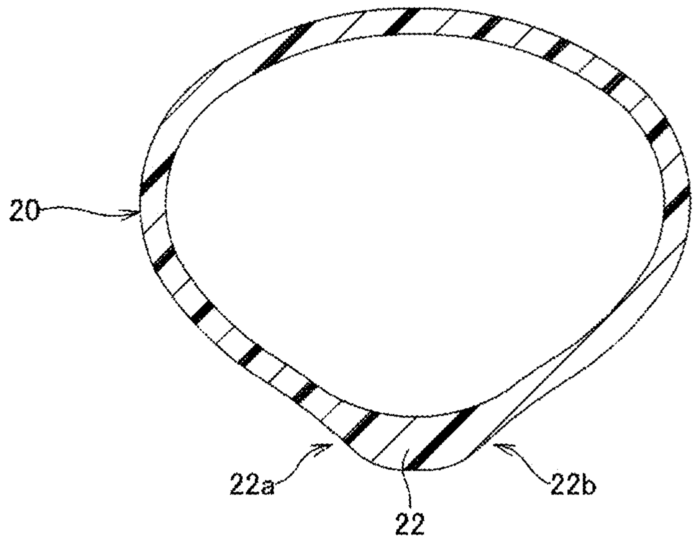
FIG. 6 is a cross-sectional view of a setting part to be set in a cavity of concha.

A zonally convexed portion 22 is provided on the ventral side of the setting part 20. A height of the zonally convexed portion 22 is not particularly limited, but is set to about 1 mm to 5 mm. As illustrated in FIG. 6, the zonally convexed portion 22 has a mountain shape in cross section, and slightly concave inclined surfaces **22*a* and 22*b*** are provided on both sides thereof.

The zonally convexed portion 22 is continuously provided from the tip of the setting part 20 to a connection portion connected with the inserting part 10.

Figure 7:
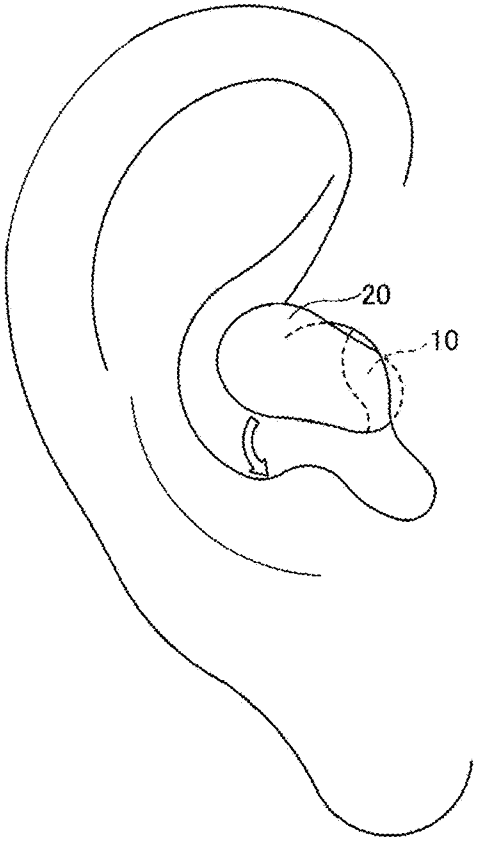
FIG. 7 illustrates a state in which the inserting part of the device of FIG. 1 is inside the external auditory canal.

For example, as illustrated in FIG. 7, the inserting part 10 of the device 1 configured as above is inserted into an external auditory canal 100 of a person so that the major axis (in the cross section) of the inserting part 10 is in the vertical direction. The state of insertion is indicated by the dotted line in FIG. 8. Although a shape of an external auditory canal of a person differs from one person to another, a major axis (in the cross section) of the external auditory canal 100 is longer than the major axis (in the cross section) of the inserting part 10 in this example. Accordingly, a random gap is formed between the external auditory canal 100 and the inserting part 10 in a state where the inserting part 10 is inside the external auditory canal 100.

Figure 8:
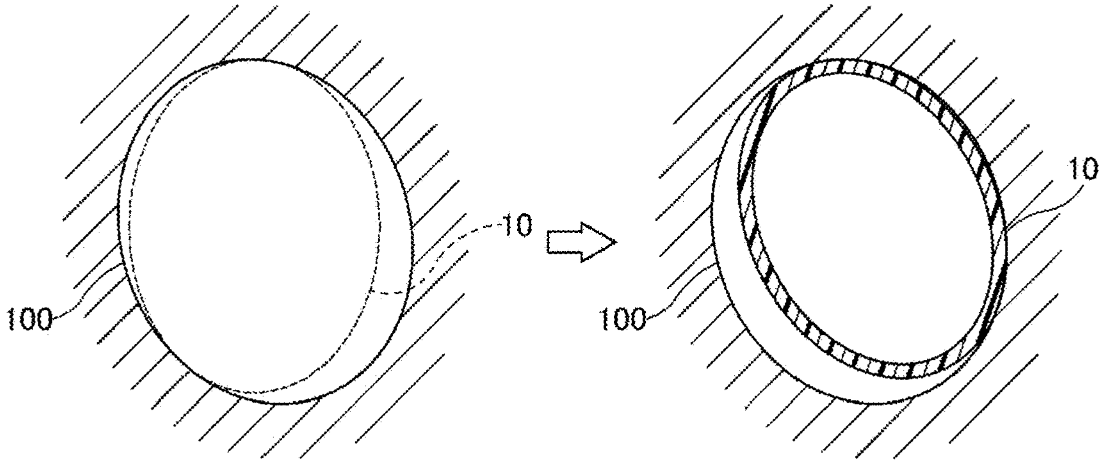
FIG. 8 is a cross-sectional view illustrating a state of insertion of the inserting part in the external auditory canal.

Therefore, when the inserting part 10 is rotated in the counterclockwise direction (in the case of a right ear) from the state illustrated in FIG. 7, the inserting part 10 comes into close contact with a front upper wall of the external auditory canal as indicated by the solid line in FIG. 8.

Since the external auditory canal 100 is not a linear hole, not only the inserting part 10 is rotated around the axis thereof, but also the inserting part 10 is moved and tilted in the longitudinal axis direction at the same time in order to obtain such close contact between the inserting part 10 and the external auditory canal 100. That is, it is necessary to rotate the whole body of the device three-dimensionally.

Since both the ventral surface of the inserting part 10 and the ventral surface of the setting part 20 are arranged on the imaginary spherical surface, the above three-dimensional rotation is easy.

In addition, since the zonally convexed portion 22 is provided on the ventral surface of the setting part 20, a space is formed between both sides of the zonally convexed portion 22 and the inner wall of the cavity of concha, and therefore the setting part 20 is easily inclined by using the space when the inserting part 10 is rotated around the longitudinal axis thereof. This reduces resistance to rotation of the inserting part 10.

Figure 9:
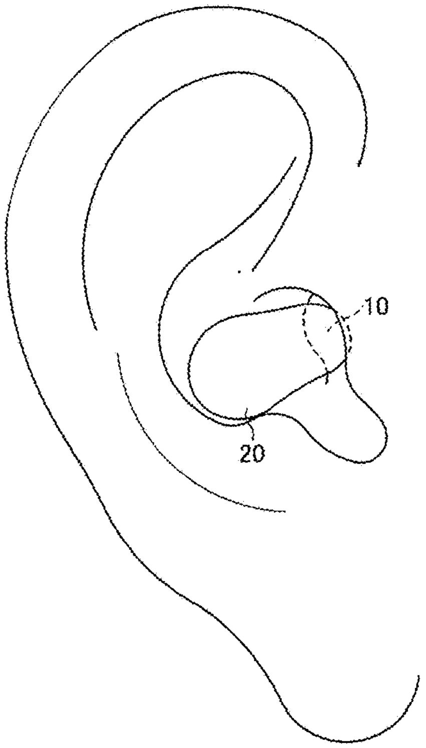
FIG. 9 illustrates a state in which the inserting part of the device of FIG. 1 has been rotated after being inserted into the external auditory canal.

FIG. 9 illustrates an example of a final attachment state of the device 1.

As indicated by the arrow in FIG. 7, the device 1 is inserted and rotated three-dimensionally while sometimes being inclined so as to follow a shape of a human ear, more specifically, shapes of a cavity of concha, an external auditory canal entrance, and an external auditory canal while rotating the inserting part 10 in the axial direction thereof. As a result, the inserting part 10 is disposed along the upper wall of the external auditory canal 100 (see the solid line in FIG. 8).

In this state, the base end portion (the connection portion connected with the setting part 20) of the inserting part 10 having a relatively large diameter is held between a tragus and a rear wall of the external auditory canal entrance, and therefore rotation around the longitudinal axis and movement in the longitudinal axis direction of the inserting part 10 are restricted. This stabilizes the position of the inserting part 10.

Furthermore, since the setting part 20 is designed to become wider from the connection portion connected with the inserting part 10 toward a rear end thereof, the setting part 20 is held stably at least one position on the cavity of concha. In addition, this restricts displacement of the inserting part 10 and allows the inserting part 10 to be stably held in surface contact on the upper wall of the external auditory canal. Note that feeling of attachment of the setting part 20 is improved by the zonally convexed portion 22 provided on the ventral surface of the setting part 20. This is because a contact area between the setting part 20 and the inner wall of the cavity of concha is reduced.

Figure 10:
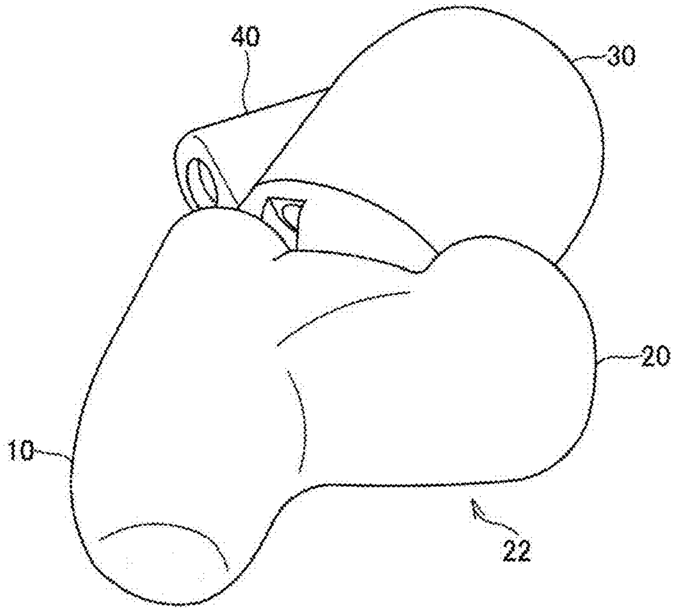
FIG. 10 is a perspective view illustrating an example in which the device is applied to a vibratory hearing aid.

FIG. 10 illustrates an example in which the device 10 is applied to a vibratory hearing aid.

In FIG. 10, the reference sign 30 denotes a vibrating device, and the reference sign 40 denotes a connection portion. A power supply line and a signal line to the vibrating device 30 are drawn to the outside via the connection portion 40.

Figure 11:
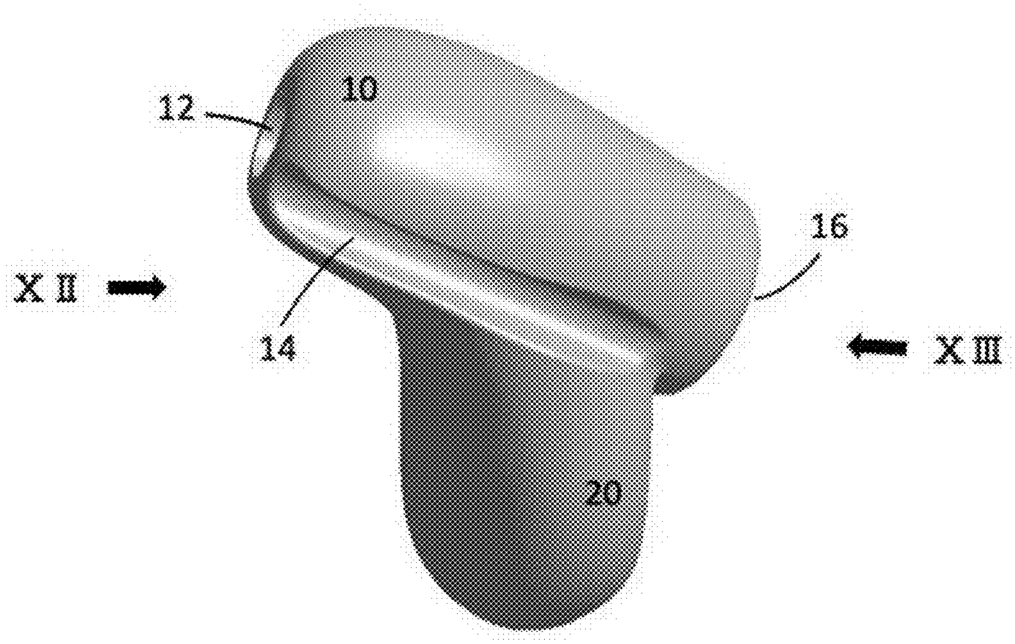
FIG. 11 is a perspective view illustrating an example in which the device is applied to another type of hearing aid, for example, an ear mold of a hearing aid (for a left ear)

FIG. 11 illustrates an example in which the device 10 is applied to an ear mold of a hearing aid. In this ear mold, a lower surface of the inserting part 10 is expanded to form a groove 14. The groove 14 serves as a vent and prevents the entire peripheral surface of the inserting part 10 from coming into close contact with a wall of an external auditory canal of a person. The groove 14 is continuously provided from the tip to an outer side of the inserting part 10. This is to produce a ventilation effect with certainty and prevent ear closing feeling with certainty. The reference sign 16 denotes a connection portion connected with a hearing aid main body.

Figure 12:
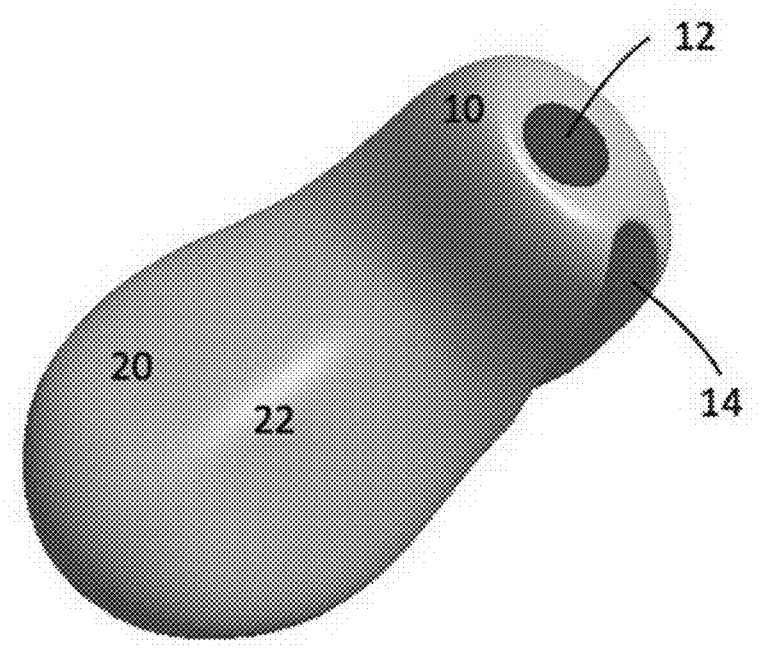
FIG. 12 is a perspective view viewed from a direction indicated by arrow XII in FIG. 11.

FIG. 12 is a perspective view viewed from a direction indicated by arrow XII in FIG. 11.

Figure 13:
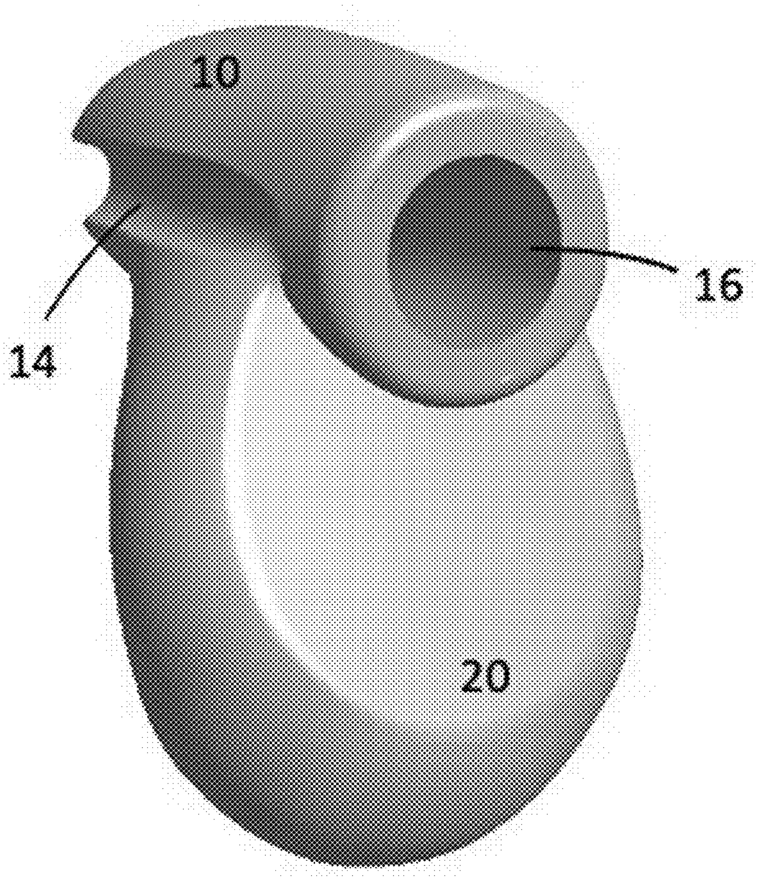
FIG. 13 is a perspective view viewed from a direction indicated by arrow XIII in FIG. 11.

FIG. 13 is a perspective view viewed from a direction indicated by arrow XIII in FIG. 11.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

REFERENCE SIGNS LIST

1 device attachable to an outer ear
10 inserting part to be inserted into an external auditory canal
12 opening
14 groove
16 connection portion
20 setting part to be to be set in a cavity of concha
22 zonally convexed portion
22*a* slightly concave inclined surface
22*b* slightly concave inclined surface
25 microphone
30 vibrating device
40 connection portion
100 external auditory canal
O imaginary spherical surface

The invention claimed is:

1. A device attachable to an outer ear of a user, comprising:

an inserting part of a tubular shape to be inserted into an external auditory canal; and a setting part to be set in a cavity of concha, wherein the inserting part and the setting part are disposed on an imaginary spherical surface, the inserting part is rotatable around a longitudinal axis thereof inside the external auditory canal, and a zonally convexed portion is provided on a surface of the setting part facing the user, and the zonally convexed portion allows the setting part to be inclined easily;

wherein the zonally convexed portion is located on a ventral side of the setting part and faces the concha;

wherein the zonally convexed portion is linear.

2. The device according to claim 1, wherein the inserting part has a shape of a round tube or a shape of an elliptical tube.

3. The device according to claim 2, wherein the inserting part is an ellipse in cross section, and a major axis of the ellipse is in a vertical direction.

4. The device according to claim 1, wherein a diameter of the inserting part gradually increases from a tip thereof toward the setting part.

5. The device according to claim 1, wherein a sound output part provided at a tip of the inserting part is disposed on a side facing the user.

6. The device according to claim 1, wherein a lower surface of the inserting part is expanded so that a groove is formed.

7. The device according to claim 1, wherein all of the inserting part having a sound output part and the setting part are made of a hard material.

8. The device according to claim 1, wherein the zonally convexed portion projects from the surface of the setting part in a same direction as the inserting part.

9. The device according to claim 1, wherein the inserting part projects from the surface on which the zonally convexed portion is provided.

10. The device according to claim 1, wherein the zonally convexed portion continuously extends, in a linear direction, from the setting part to a connection portion connected with the inserting part, and, when the inserting part is inserted into the external auditory canal, a space is formed between both sides of the zonally convexed portion and an inner wall of the concha.

11. A device attachable to an outer ear of a user, comprising:

an inserting part of a tubular shape to be inserted into an external auditory canal; and a setting part to be set in a cavity of concha, wherein a zonally convexed portion is provided on a surface of the setting part facing the user, and the zonally convexed portion allows the setting part to be inclined easily;

wherein the zonally convexed portion is located on a ventral side of the setting part and faces the concha;

wherein the zonally convexed portion is linear.

12. The device according to claim 11, wherein the zonally convexed portion continuously extends, in a linear direction, from the setting part to a connection portion connected with the inserting part, and, when the inserting part is inserted into the external auditory canal, a space is formed between both sides of the zonally convexed portion and an inner wall of the concha.

13. A device attachable to an outer ear of a user, comprising:

an inserting part to be inserted into an external auditory canal; and a setting part to be set in a cavity of concha, wherein the inserting part and the setting part have an elliptical shape in cross section, the inserting part and the setting part are curved as a whole so as to be disposed on an imaginary spherical surface, when the inserting part is inserted into the external auditory canal so as to be pressed against an upper wall of the external auditory canal, the inserting part rotates inside the external auditory canal due to the elliptical shape thereof, makes surface contact with the upper wall of the external auditory canal, and creates a space serving as a vent on a lower wall side of the external auditory canal; and a zonally convexed portion is provided on a surface of the setting part facing the user;

wherein the zonally convexed portion is located on a ventral side of the setting part and faces the concha;

wherein the zonally convexed portion is linear.

14. The device according to claim 13, wherein the zonally convexed portion continuously extends, in a linear direction, from the setting part to a connection portion connected with the inserting part, and, when the inserting part is inserted into the external auditory canal, a space is formed between both sides of the zonally convexed portion and an inner wall of the concha.

15. A device attachable to an outer ear of a user, comprising:

an inserting part of a tubular shape to be inserted into an external auditory canal; and a setting part to be set in a cavity of concha, wherein the inserting part and the setting part are disposed on an imaginary spherical surface, and the inserting part rotates around a longitudinal axis thereof inside the external auditory canal, and a position of the setting part is adjusted while keeping the setting part in contact with the cavity of concha and a zonally convexed portion is provided on a surface of the setting part facing the user;

wherein the zonally convexed portion is located on a ventral side of the setting part and faces the concha;

wherein the zonally convexed portion is linear.

16. The device according to claim 15, wherein the zonally convexed portion continuously extends, in a linear direction, from the setting part to a connection portion connected with the inserting part, and, when the inserting part is inserted into the external auditory canal, a space is formed between both sides of the zonally convexed portion and an inner wall of the concha.

* * * * *